Dec. 8, 1959 LE ROY V. OXLEY ET AL 2,916,128

METHOD AND MEANS OF SIMULTANEOUSLY ADDRESSING LETTERHEADS AND ENVELOPES

Filed Aug. 16, 1955 6 Sheets-Sheet 1

Inventors
Le Roy V. Oxley
Clarence M. Blythe

By Shoemaker & Mattare
ATTYS

Dec. 8, 1959 LE ROY V. OXLEY ET AL 2,916,128

METHOD AND MEANS OF SIMULTANEOUSLY ADDRESSING LETTERHEADS AND ENVELOPES

Filed Aug. 16, 1955 6 Sheets-Sheet 2

Inventors
Le Roy V. Oxley
Clarence M. Blythe
By Shoemaker & Mattare
ATTYS

Inventors
Le Roy V. Oxley
Clarence M. Blythe
By Shoemaker & Mattare
ATTY.

Inventors
Le Roy V. Oxley
Clarence M. Blythe
By Shoemaker & Mattare
ATTYS

Dec. 8, 1959 LE ROY V. OXLEY ET AL 2,916,128

METHOD AND MEANS OF SIMULTANEOUSLY ADDRESSING LETTERHEADS AND ENVELOPES

Filed Aug. 16, 1955 6 Sheets-Sheet 5

Inventors
Le Roy V. Oxley
Clarence M. Blythe
By Shoemaker & Mattare
ATTYS

Dec. 8, 1959 LE ROY V. OXLEY ET AL 2,916,128

METHOD AND MEANS OF SIMULTANEOUSLY ADDRESSING LETTERHEADS AND ENVELOPES

Filed Aug. 16, 1955 6 Sheets-Sheet 6

*Inventors*
Le Roy V. Oxley
Clarence M. Blythe

*By Shoemaker & Mattare*
*ATTYS*

United States Patent Office 2,916,128

Patented Dec. 8, 1959

2,916,128

METHOD AND MEANS OF SIMULTANEOUSLY ADDRESSING LETTERHEADS AND ENVELOPES

Leroy V. Oxley and Clarence M. Blythe, Hendersonville, N.C., assignors to Robotyper Corporation, Hendersonville, N.C., a corporation of Michigan Application August 16, 1955, Serial No. 528,687

13 Claims. (Cl. 197—5)

This invention relates to improvements in methods of typing and has for an important object to provide a new and novel method, or system, and means for carrying out the same, whereby a material saving in time can be effected in typing names and addresses at the heads of form letters and typing of the same names and addresses on envelopes in which the form letters are to be mailed.

The present invention contemplates the use of automatically operated typewriters of the character employed for writing form letters wherein the typing action of the typewriter keys is pneumatically effected by a perforated control tape passing over a tracker bar. Such automatically operated typewriters are of well known standard construction.

In the present use of such automatically operated typewriters for writing form letters it is necessary for an operator or person attending to the operation of the automatic typewriter, after placing a letterhead in the typewriter, to manually type in the name and address of the person to whom the letter is to be sent after which the operating mechanism for the automatic typewriter is turned on and the typewriter then automatically writes the form letter under the control of the perforated control tape. The person attending to the operation of the automatic typewriter must then go to another typewriter and manually type on an envelope the name and address of the person to whom the form letter is to be sent. Thus it will be seen that the person controlling the operation of the automatic typewriter must move back and forth between the automatic typewriter and the manually operated one to first type in the name and address at the head of the letter as stated and to then address the envelope.

In the light of the foregoing it is a primary object of the present invention to provide a novel hook-up between an automatically operated typewriter of the character stated and a manually operated typewriter whereby after the letterhead has been placed in the automatic typewriter, the typing of the name and address at the head thereof and also the typing of the name and address on an envelope in the manually operated machine can be automatically simultaneously accomplished.

It is a further object of the present invention to provide a means whereby two or more of such automatically operated typewriters can be operatively coupled with a manually operated typewriter whereby an operator seated at the manually operated typewriter can shift control from one automatic typewriter to the other and thus, after typing the name and address at the head of a letter in one automatic typewriter while at the same time or simultaneously typing the same name and address on an envelope in the manually operated typewriter, then shift the control to another automatically operating typewriter and while the first automatic typewriter is functioning to type the form letter the operator can be typing the name and address at the head of a letter on the second typewriter while simultaneously typing the same name and address on an envelope in the manually operated typewriter.

In automatically operated typewriters of the character referred to each of the typewriter keys is operatively connected with a pneumatically actuated element of a selector unit and such pneumatically operated elements are connected by tubes with apertures in a tracker bar across which the perforated control tape passes. The elements of the selector unit are kept under vacuum and each time an aperture of the perforated control tape registers with an aperture in the tracker bar the vacuum in the tube connected with that aperture is broken and the element of the selector unit to which the tube runs is actuated to effect the operation of the typewriter key lever with which the unit is operatively connected.

In carrying out the present invention a bank of blocking valves is provided, each valve of the bank having an air line connected between one side thereof and one of the air tubes of the automatic typewriter and means is provided in association with the manually operated typewriter whereby when the bank of blocking valves is open and a key of the manually operated typewriter is depressed an air impulse will be permitted to pass through the blocking valve into an evacuated tube of the automatic typewriter whereby the automatic typewriter key associated with that tube will be actuated, such key being the same letter key as that depressed by the operator manually on the manually operated typewriter. In other words the number of valves in the bank of blocking valves will correspond to the number of keys actuated by the operator on the manually operated typewriter and to be actuated on the automatic typewriter so that the acuation of any key of the manually operated typewriter will bring about the actuation of the corresponding key on the automatic typewriter. The blocking vlaves of the bank are actuated to open position by pneumatic means under the control of the operator of the manually operated typewriter and after the operation of typing the address at the head of the letter on the automatic typewriter and typing the same address on the envelope on the manually operated typewriter is completed the blocking valves are closed so that the automatic typewriter can be set in operation to automatically type the form letter in the standard manner under the control of the perforated tape.

Where two or more automatic typewriters are to be controlled from a single manually operated typewriter a bank of such blocking valves will be provided for each automatic typewriter and the corresponding sides of the valves of each bank are connected to common pneumatic lines each running to an impulse plate terminal located beneath the keyboard of the manually operated typewriter and associated with one type key of the latter.

The invention will be best understood from a consideration of the following detailed description taken in connection with the accompanying drawings forming a part of the specification with the understanding, however, that the invention is not confined to a strict conformity with the showing of the drawings, but may be changed or modified in the scope of the appended claims.

Referring now more particularly to the drawings the invention has been illustrated and will be described in connection with two automatically operated typewriters and a single manually operated typewriter but it is to be understood that the invention is not restricted in any way to the number of automatic typewriters which may be employed or controlled by the single manually operated typewriter since one mechanically operated typewriter may be used with the single manually operated typewriter or two or more mechanically operated typewriters may be used and controlled by a single manually operated typewriter as may be desired by the employment of the proper number of banks of blocking valves, on-off valves and controls for the on-off valves.

Figure 1:
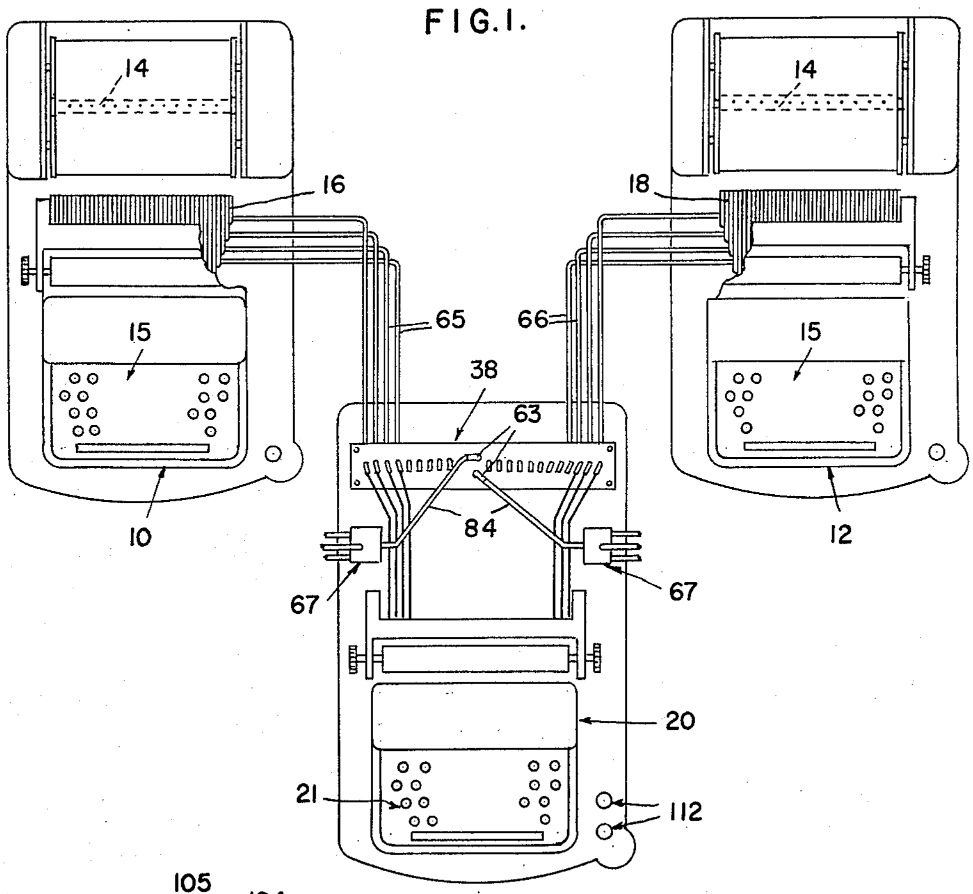
Fig. 1 is a view in plan of a master and two robot typewriters, diagrammatically illustrated, showing the coupling of the same together in accordance with the present invention.
Figures 4, 5:
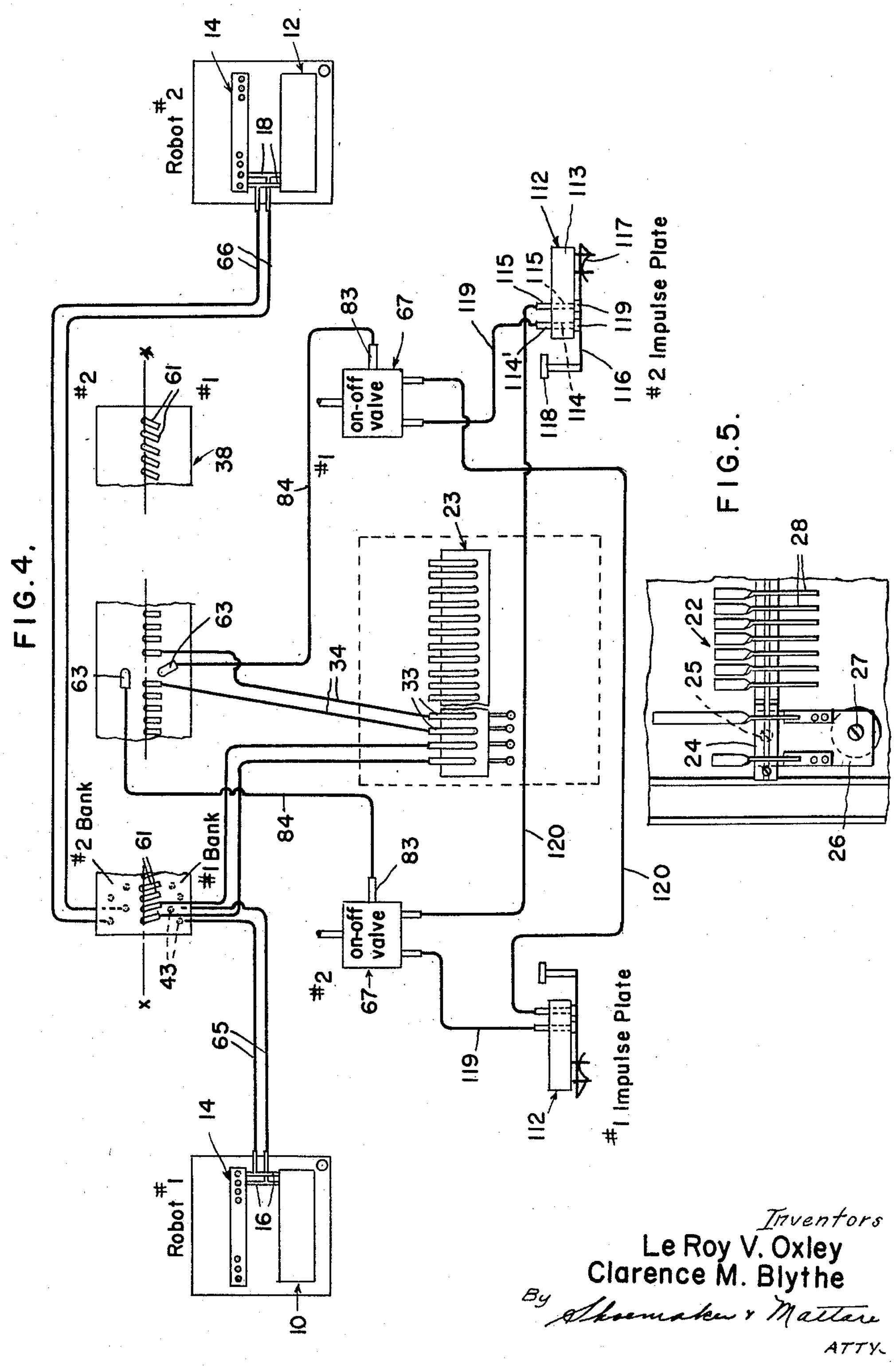
Fig. 4 is a flow diagram of the connections, in part only, between the typewriting machines.
Fig. 5 is a detail view showing in bottom plan a part of the harness mechanism and mounting for the same.

In the drawings, referring particularly to Figs. 1 and 4, the numerals 10 and 12 each designates generally an automatically operated typewriter of the character hereinbefore referred to namely a typewriter having a pneumatic system associated therewith and controlled by a perforated tape or ribbon whereby a form letter may be automatically typed on the machine under the control of the perforated tape. These machines 10 and 12 may be further identified, for subsequent convenience in describing the operation of the system, as robot No. 1 and robot No. 2 respectively.

As previously stated these automatically operated typewriters are of standard well known construction and accordingly no detailed illustration has been made of the same nor is it believed to be necessary to an understanding of the present invention.

Examples of automatic typewriters of the character herein referred to are shown in Patents 2,180,793; 2,184,278 and 2,377,323 and others.

As previously stated the robot machines or automatically operated typewriters each includes a perforated tracker bar 14 and a selector mechanism, not illustrated, which is located beneath the typewriter keyboard 15 wherein individual vacuum actuated elements are located and are operatively coupled with the typewriter keys to operate the latter upon the admission of air impulses into vacuum lines connected between the apertures of the tracker bar and the elements of the selector mechanism.

In the diagrammatic illustration of the automatically operated typewriters or robot machines only two of such vacuum lines are illustrated extending each from an aperture in the tracker bar to a pneumatically operated element of the machine selector mechanism. In the machine 10 the two vacuum lines or tubes referred to are designated 16 and in the machine 12 the two vacuum lines are designated 18. It will, of course, be understood that in each of these machines there will be one of these vacuum lines for each keyboard element, which element will be actuated upon the introduction of an air impulse into such vacuum line either through an aperture of the tracker bar, as when a machine is operating for automatically typing a form letter, or through a line controlled by an operator of the hereinafter described manually operated typewriter when the tape operating mechanism for the mechanically operated typewriter is not working but a vacuum is still maintained in the lines 16 and 18 by the vacuum apparatus associated with the respective automatically operated typewriters.

The numeral 20 generally designates a typewriter of conventional type, either electrical or non-electrical, the keyboard of which is generally designated 21.

The manually operated typewriter 20 has secured across the underside thereof a key harness unit which is generally designated 22 and an impulse plate which is generally designated 23.

The key harness unit and impulse plate (see Figs. 3 and 5) are of the same construction as shown in our co-pending application for patent on a program tape controlled master and slave unit, Serial No. 510,791, filed May 24, 1955.

The key harness unit is secured across and to the underside of the manually operated typewriter frame. This harness comprises a bar 24 which is secured at each end in a suitable manner, as for example, by means of screws 25, to an end of a mounting plate 26 which, in turn, has its other end secured by a screw 27 engaged in an existing screw hole in the underside of the typewriter frame.

This bar 24 lies below and transversely of the key elements of the typewriter by which the type bars and other elements of the machine are actuated.

The bar 24 supports upon a longitudinally extending pivot means of a suitable character, a number of levers 28 which are substantially horizontally disposed and extend in approximately parallel relation with the overlying key bars. These levers equal in number the key bars of the typewriter.

The forward ends of the levers 28 are each operatively connected by a suitable actuating wire or rod 29 with the typewriter key bell crank (not shown) whereby upon operation of the type key which causes oscillation of such bell crank, an upward pull will be applied to the wire or rod to oscillate the lever 28 to which it is attached, causing the rearwardly directed end of the lever to swing downwardly.

The impulse plate unit comprises the plate body 30 which is disposed rearwardly of the key harness unit and is mounted upon and suitably secured to the typewriter machine supporting base. The plate body 30 is provided with a longitudinally extending row of apertures 32 which extend entirely through the plate and equal or exceed in number the number of levers pivotally supported upon the key harness unit bar 24.

The apertures 32 of the impulse plate are directed upwardly and each has connected therewith, in the top part thereof, a tube coupling nipple 33 with which is connected one end of an air impulse tube 34.

Disposed across the underside of the plate body 30 is a plurality of flat, relatively thin valve strip elements 35 each of which carries a pad 36 which is adapted to close an overlying aperture 32. Each of the apertures has one of these valve strip elements associated with it and is normally closed by the pad carried by such element. Each of the valve strip elements projects beyond the forward side of the plate body 30 and has an upturned terminal portion 37 which is adjusted to lie directly below the rearwardly extending flattened end portion of the lever 28 whereby when the lever is oscillated by the actuation of the typewriter key crank with which it is connected, the rear end of the lever will swing down and push down upon the upturned portion 37 to open the air impulse aperture which is closed by the pad of that particular valve element.

Since the key harness unit and impulse plate unit here described are disclosed and more specifically described and also claimed in our co-pending application hereinbefore referred to it is not believed that a further detailed description of these units is necessary to an understanding of the functioning of the same in the system of the present application.

The air impulse tubes 34, when opened by the actuation of keys of the manually operated typewriter, through the medium of the key harness and impulse plate units, admit air impulses to the vacuum lines or tubes of a robot machine or to robot machines under the control of the manually operated typewriter, through an interposed blocking valve unit or bank of blocking valves about to be described. By the use of an on-off valve, also hereinafter described, the bank of blocking valves to a robot machine can be closed so that the manually operated typewriter can be operated without operating or affecting the operation of the robot machine when desired or opened so that the robot machine can be caused to operate upon the actuation of the keys of the manually operated typewriter. Two robot machines are here shown which are controlled by the one manually operated typewriter and such control can be switched from one robot to the other by the novel coupling up of a pair of on-off valves and by the use of impulse valves which are operated manually by the person operating the manually operated typewriter. If one mechanically operated typewriter is used and controlled by the manually operated typewriter, one on-off valve is necessary with two impulse valves. If more than two robots are being operated there will be an on-off valve and a bank of blocking valves for each robot and necessary manual impulse valves for effecting the desired operation of the on-off valves, as will be readily seen from the following description.

Figure 3:
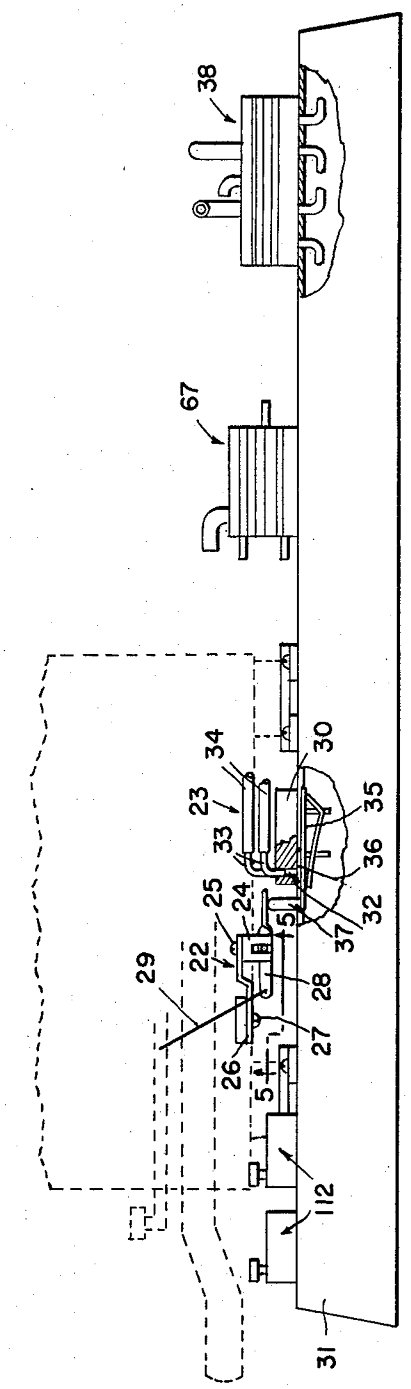
Fig. 3 is a view in side elevation of the base for the master typewriter showing coupled key harness and impulse plate, an on-off valve and banks of blocking valves.
Figures 6, 7, 8, 9, 10:
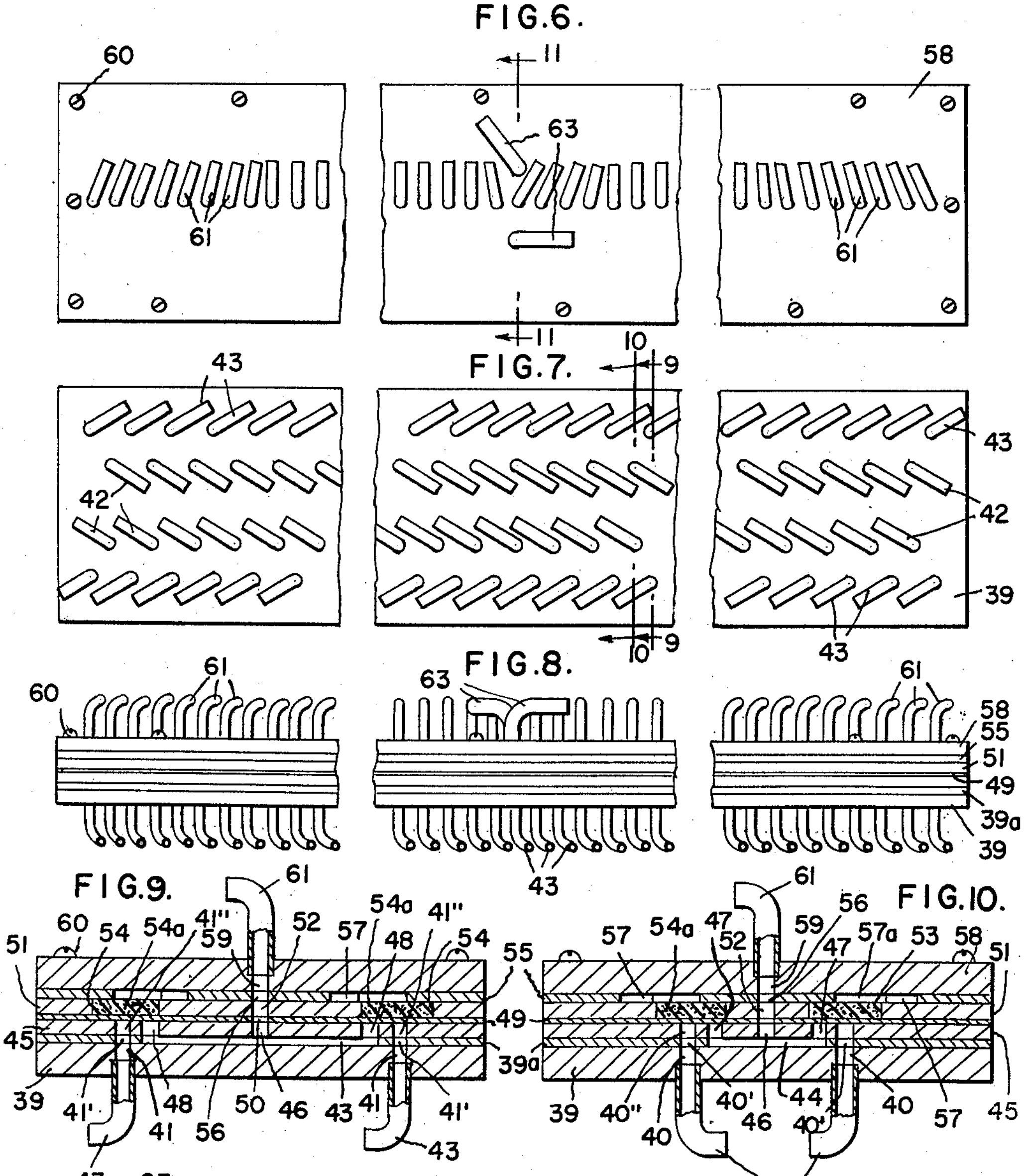
Fig. 6 is a top plan view of the assembly embodying two blocking valve banks.
Fig. 7 is a bottom plan of assembly.
Fig. 8 is a side view of the assembly.
Fig. 9 is a transverse section taken on line 9—9 of Fig. 7.
Fig. 10 is a transverse section taken on line 10—10 of Fig. 7.
Figure 11:
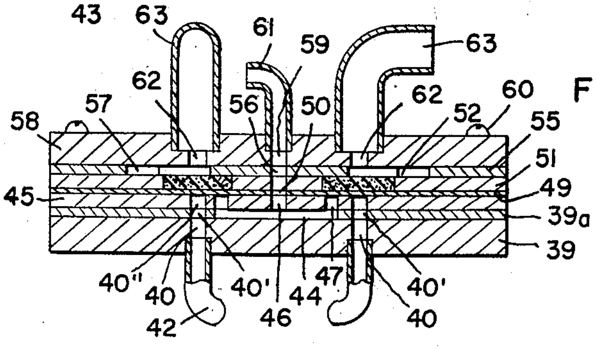
Fig. 11 is a transverse section taken on line 11—11 of Fig. 6.
Figure 12:
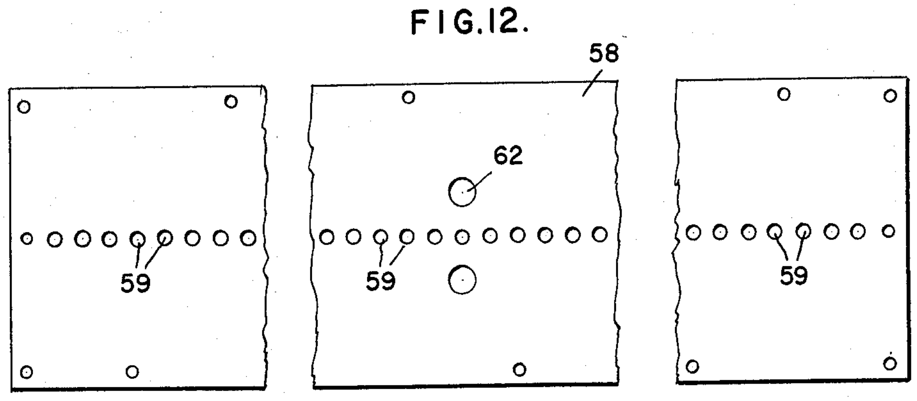
Fig. 12 is a plan view of the top plate of the assembly.
Figure 13:
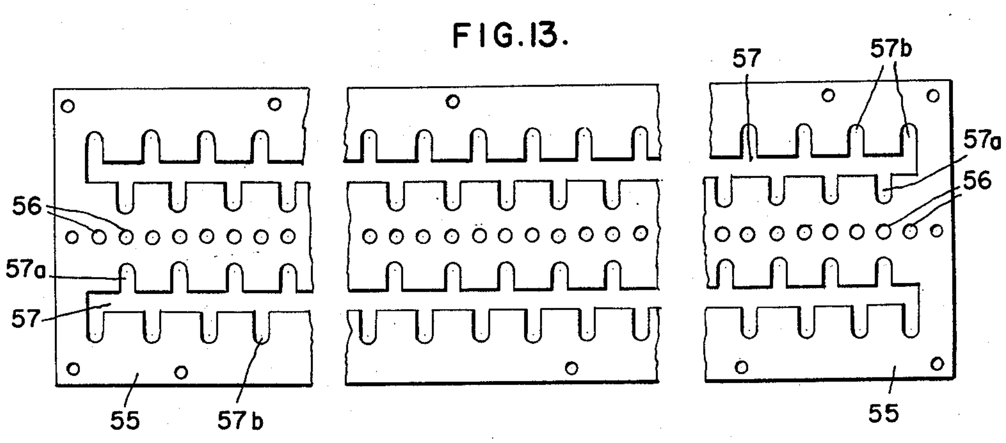
Fig. 13 is a plan view of the gasket having longitudinal exhaust slots therein.

The numeral 38 generally designates a two-bank blocking valve unit shown in Figs. 6, 7 and 8 in top, bottom and side elevation respectively and in transverse section in Figs. 9, 10 and 11. In Figs. 1, 3 and 4 this unit is diagrammatically illustrated. Each of the two banks of blocking valves serves one robot machine and in the two-bank unit illustrated there is one air impulse line connection which is common to a valve in each of the two banks so that the actuation of a key of the master manually operated typewriter will send an air impulse to such common connection to pass through one or the other of the two blocking valves with which such common connection is associated depending upon which of the two valves is open so that such air impulses will be properly routed to the correct robot machine.

Figure 18:
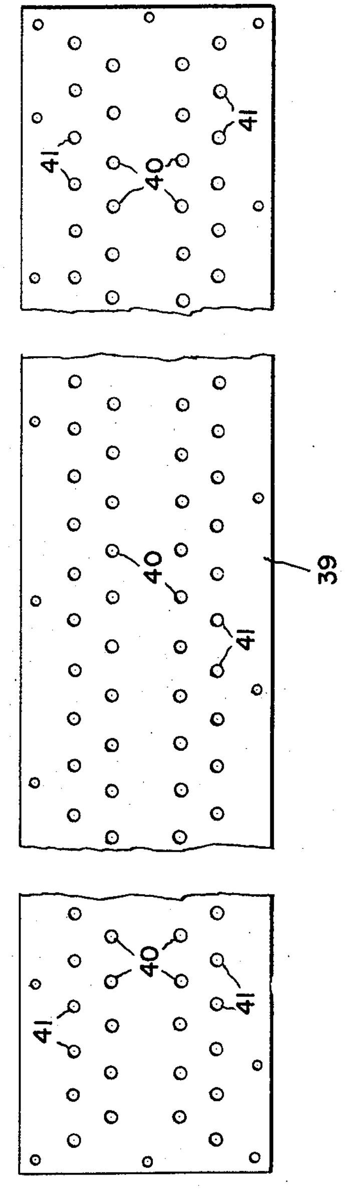
Fig. 18 is a plan view of the bottom plate.

The two-bank blocking valve unit comprises a long flat bottom plate 39 through which are formed two inner rows of apertures 40, Fig. 18, extending longitudinally thereof on opposite sides of the longitudinal center, and two outer rows of apertures 41 which are in staggered relation with the apertures of the inner rows. These inner and outer rows of apertures have connected therewith the inner and outer nipples 42 and 43 respectively, see Fig. 7.

Figure 17:
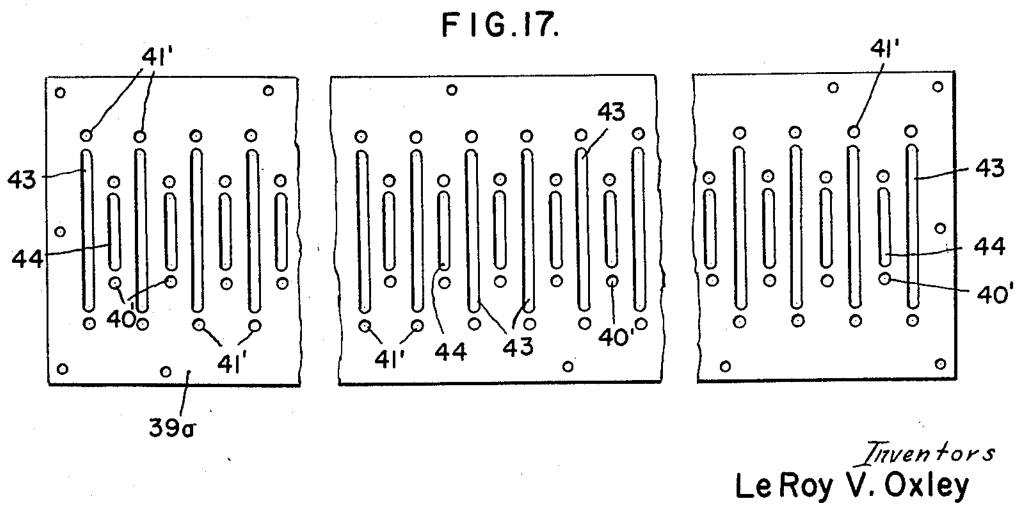
Fig. 17 is a plan view of the gasket strip overlying the bottom plate.

Overlying the bottom plate 39 is a gasket strip or sheet **39*a*, Fig. 17, of suitable gasket material, in which are formed the inner longitudinal rows of apertures 40′ and the outer longitudinal rows of apertures 41′. These apertures 40′ and 41′ are positioned to align with the apertures 40 and 41** of the bottom plate.

In addition to the apertures 40′ and 41′ the gasket **39*a* has the alternating transversely directed long and short slots 43 and 44, the long slots lying between the transversely aligned outer apertures 41′ while the shorter slots lie between the transversely aligned or spaced inner apertures 40′. These transverse slots 43 and 44** provide for the transmission of air impulses alternately to one or the other of two transversely spaced blocking valves as will be hereinafter fully disclosed.

Figure 16:
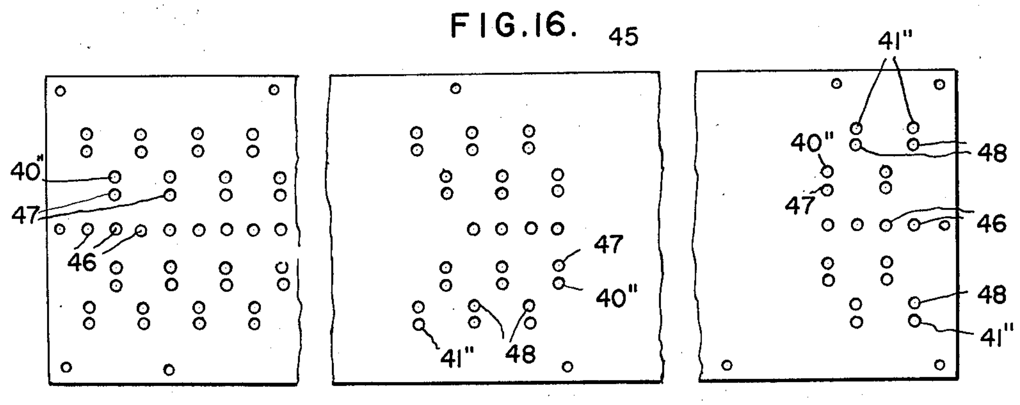
Fig. 16 is a plan view of the impulse plate underlying the diaphragm.

Overlying and resting upon the gasket **39*a* is an impulse plate 45**. See Fig. 16.

The impulse plate 45 has a single central longitudinal row of fifty-two apertures 46. At each side of this central row of apertures 46 are two longitudinal rows of apertures. These apertures of the two rows are in alignment transversely of the plate with a central aperture 46 and the apertures of the innermost row are designated 47 while those of the adjacent row lying outside of the apertures 47 are designated 40″ and are positioned to align with the hereinbefore described aligned apertures 40 and 40′. The apertures 47 each opens into or registers with an end of a short cross slot 44 as shown in Figs. 10 and 11.

Lying outside of the two rows of apertures 40″ and 47 are two outer rows. The apertures of the innermost one of these two outer rows are designated 48 while the apertures of the outermost ones of these outer rows are designated 41″. The apertures 41″ are positioned to align with apertures 41 and 41′ while the apertures 48 each registers with an outer end of a long cross slot 43 in the gasket **39*a***, as illustrated in Fig. 9.

Lying over and upon the top of the impulse plate 45 is a leather sheet or actuating diaphragm 49 formed or consisting of pouch leather or any other suitable material. This actuating diaphragm is provided with a central longitudinal series of apertures 50 totaling fifty-two in number and positioned to align with the apertures 46 of the underlying impulse plate. This actuating diaphragm covers the upper ends of the apertures or ports 40″, 41″, 47 and 48 when the top surface of the diaphragm is subjected to atmospheric pressure and therefore when the diaphragm is in this closed position no air impulse can pass from the apertures or ports 47 across to the adjacent apertures 40″ or from the apertures or ports 48 across to the adjacent apertures 41″.

Figure 14:
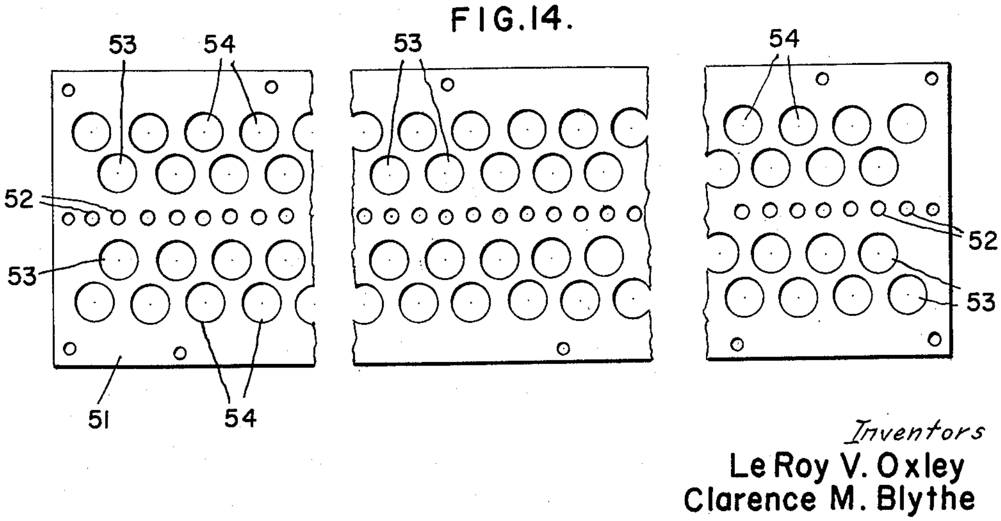
Fig. 14 is a plan view of the spacer plate.
Figure 15:
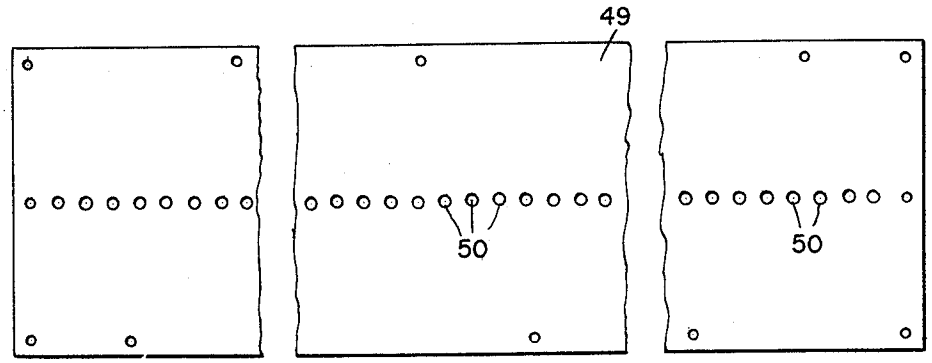
Fig. 15 is a plan view of the diaphragm.

Lying over and upon the diaphragm 49 is the spacer plate 51. See Fig. 14. This plate has a central longitudinal row of apertures 52 therethrough bordered on each side by the inner longitudinal row of spacer openings 53 and an outer row of corresponding spaced openings 54. The inner openings 53 overlie the ports or apertures 40″ and the outer openings 54 overlie the ports or apertures 41″ as shown in Figs. 9 and 10.

The numeral 55 designates a gasket having a central longitudinal row of apertures 56 formed therethrough. At each side of this row of apertures is a longitudinal exhaust slot 57. Each of these slots 57 along its inner side communicates with the short inwardly directed vestibule slots **57*a* which are in alignment across the gasket and each of which lies beneath an inner opening 53**, as illustrated in Figs. 10 and 11.

In addition to the slots **57*a*, each longitudinal slot 57 communicates along its outer side with the short outwardly directed vestibule slots 57*b* which are also in alignment across the gasket but are out of alignment, or in staggered relation, with the slots 57*a*. Each of these vestibule slots 57*b* lies beneath an outer opening 54**, as illustrated in Fig. 9.

Each of the inner and outer openings 53 and 54 in spacer palte 51 has fitted therein a resilient disc **54*a*. These discs are preferably of sponge rubber, or other material having like characteristics of resiliency which would be suitable to perform the desired action or function in the blocking valve structure. As shown in Figs. 9, 10 and 11 each disc lies beneath a vestibule slot 57*a* or 57*b* and rests upon the underlying diaphragm 49**.

The numeral 58 designates a top plate which has formed therethrough the central longitudinal row of apertures 59 each of which aligns and communicates with the apertures 46, 50, 52 and 56 respectively of the impulse plate 45, the spacer plate 51 and the exhaust gasket 55. These aligned and communicating apertures communicate with the cross slots 43 and 44.

All of the plates, gaskets and actuating diaphragm are secured together to form the unit by means of bolts or screws 60 which are passed through suitable openings in the several plates, gaskets, etc.

In addition to the central longitudinal row of apertures 59 in the top plate, in each of which is secured an end of a nipple 61, the top plate has formed therethrough the two exhaust line openings 62 in each of which is secured an end of a nipple 63 and each of these openings 62 is in comunication with an exhaust slot 57 as shown in Fig. 11.

As previously stated there are fifty-two of the top plate apertures 59 and nipples 61 and in each of the two-banks of blocking valves there are fifty-two openings in the bottom plate 39 which are divided into an inner row of twenty-six designated 40 and the adjacent outer row of twenty-six designated 41. See Fig. 18.

As previously stated, each bank of blocking valves consists of fifty-two valves.

Each valve embodies, referring to either side of Fig. 9, aligned ports 41, 41', 41'', port 48, slot 43, ports 46, 50, 52, 56 and 59, the air exhaust channel 57, opening 54, diaphragm 49 and a sponge rubber disc **54*a***.

Referring to either side of Fig. 10 or Fig. 11, the blocking valves shown consist of the same parts, each valve in these figures comprising aligned ports 40, 40', 40'', port 47, slot 44, ports 46, 50, 52, 56 and 59, the air exhaust channel 57, opening 53, diaphragm 49 and a sponge rubber disc **54*a***.

When vacuum is applied to either exhaust slot 57, in the exhaust gasket 55, by way of a nipple 63, the diaphragm 49 lying under the two rows of openings 53 and 54 of the bank of valves will be drawn up into the openings against the resistance of the sponge rubber discs therein, each of which discs underlies a lateral extension of the vacuum passage or exhaust slot 57. Thus all of the blocking valves of the one bank will be opened by providing a space under each drawn up portion of the diaphragm for the passage of an air impulse through a nipple 61, across between two adjacent ports 48—41', or 47—40', respectively to a nipple 43 or 42.

As hereinbefore stated two banks of blocking valves are incorporated in the unit 38 and the unit in the diagrammatic view forming Fig. 4 is shown as having a longitudinal central division line X—X on one side of which lies one bank of blocking valves which are designated No. 1 while on the other side of this line lies the second bank of blocking valves designated No. 2. The bank of valves No. 1 controls the robot machine No. 1 and the bank of valves No. 2 controls the robot machine No. 2 in the manner hereinafter described.

Each of the nipples 42, 43 (shown in Figs. 9 and 10) of valve bank No. 1 is connected by a tube 65 with one of the air tubes 16 of robot machine No. 1.

Each of the nipples 42, 53 of valve bank No. 2 is connected by an air tube 66 with a vacuum line or tube 18 of robot machine No. 2.

The numeral 67 designates two on-off valves, each of which is associated with one valve bank. These valves function to turn on or off the blocking valves of the respective banks with which they are connected through the exhaust line nipples 63.

Figure 2:
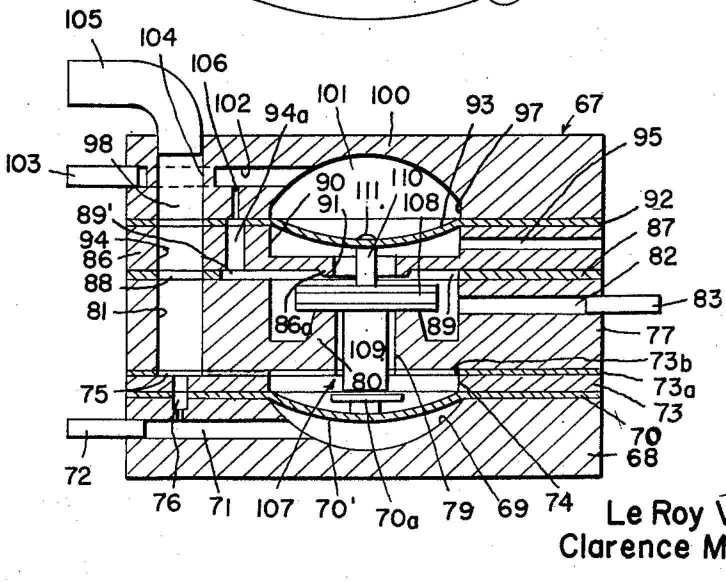
Fig. 2 is a sectional view of one of the on-off valves, showing details of construction.

The on-off valves are of known construction and in order that the functioning of the same may be understood to facilitate an understanding of the operation of the present system one of such valves is illustrated diagrammatically in Fig. 2.

The on-off valve is preferably made up of a plurality of plates and gaskets and movable valve elements, as hereinafter described and may be built up from a number of standardized parts in the manner illustrated, described and claimed in our co-pending application Ser. No. 467,354, filed November 8, 1954. While the valve as here illustrated functions in the same manner as that disclosed in the above application the number of parts shown has been reduced for simplifying the description.

The valve as here illustrated, comprises the bottom plate 68 which has a pouch depression or recess 69 of circular form in the top thereof.

Disposed upon the top of the plate 68 and lying over the depression 69, is the diaphragm sheet 70, the central portion of which is formed, by pressing or otherwise, into the downwardly extending or curving pouch 70' which extends into the recess or depression 69, as shown.

An air passage 71 extends through the base plate 68 from the outside into the recess 69 and a nipple 72 is engaged in the outer end of this passage.

Secured to the top side of the pouch 70' is a button **70*a***.

Overlying and resting upon the diaphragm sheet 70 is a spacer plate 73 which has the central opening 74 coinciding with the pouch recess 69 and the pouch 70' and upon the top of the spacer 73 is a gasket **73*a* also centrally apertured as at 73*b* to match the opening 74. From this central aperture 73*b* a lateral slot 75 leads, through which air may be drawn by a suitable vacuum pump, as hereinafter set forth, from the space above the pouch 70'**.

Leading downwardly from the slot 75 is the bleed passage 76 which communicates through a restriction of its lower end with the air passage 71.

Overlying and upon the gasket **73*a* is the valve seat plate 77 in whch is formed from the top the recess 78, which may be circular. From the bottom, the plate 77 has formed upwardly, the central passage 79, of much smaller diameter than the recess 78** into which it opens at its upper end.

At the upper recess end of the passage an upstanding annular flange 80 around the passage forms a valve seat.

The numeral 81 designates an air passage formed through the plate 77 and which communicates at its lower end with the slot 75 while the numeral 82 designates a second air passage one end of which opens into the recess 78 while at its end it is connected with a nipple 83.

The nipple 83 of each on-off valve is connected by an air tube 84 with one exhaust line nipple 63 of a bank of blocking valves.

The numeral 86 designates a breather plate which overlies the valve seat plate 77 and interposed between these two plates is a centrally apertured gasket 87 which has the aperture 88 therethrough aligning with the passage 81 and the central opening 89 coinciding with the top of the circular recess 78 and having a recess slot 89' leading therefrom for the purpose about to be described.

The plate 86 has formed in the top thereof the circular recess 90 which is of the same size as the recess 78 and arranged co-axially therewith and the bottom of this recess 90 has the central opening 91 which is of approximately the same size as the passage 79 with which it is in alignment. The underside of the plate 86 has an annular flange **86*a* around the opening 91** forming a valve seat.

Overlying the plate 86 is an upper diaphragm 92 which has the pressed central pouch portion 93 which lies in the recess 90 and which is provided with suitable apertures for alignment with the air passages or openings 94 and **94*a* formed through the plate 86. The passage 94 aligns with the passages 81 and 88 while the passage 94*a* opens at its lower end in the recess 89'**.

The plate 86 is also provided with a breather passage 95, the inner end of which opens into the recess 90 while the outer end opens to the atmosphere.

Lying upon the diaphragm 92 is the top plate 100 of the valve.

In the underface of this plate is the pouch recess 101 into which the pouch 93 of the diaphragm 92 rises in one operation of the valve. This plate also has the air passage 102 communicating at one end with the pocket 101 and having the nipple 103 connected with its outer end.

The plate 100 also has the air passage 104 which aligns with the passages 94 and 81 at its lower end and at its upper end is conencted with a nipple 105. This nipple 105 of each of the on-off valves is connected with a suitable vacuum pump whereby a reduced air pressure may be maintained in the passages leading from the nipple through the valve body into the opening 74 forming the upper part of the lower pouch pocket of the valve body.

There is also provided the small bleed passage 106 leading from the air passage 102 of the top plate 100 downwardly for communication with the passage 94*a* leading into the recess 78.

The numeral 107 generally designates the valve element which operates relative to the seat flanges 80 and 86*a*. This element comprises the valve disc 108 from the underside of which extends the stem 109 which projects downwardly through the passage 79 into the chamber formed by the recess 74 above the pouch 70' terminating in close proximity to the button 70*a*. The underface of this disc 108 carries suitable leather for contact with the seat flange 80 while the upper face of the disc is also provided with the leather for contact with the seat flange 86*a*.

Extending upwardly from the center of the disc 108 is the smaller stem 110, the upper end of which is secured as indicated at 111 to the center of the diaphragm pouch 93.

In the operation of the on-off valve a reduced air pressure is maintained in the line leading to the nipple 105 and consequently in the chamber above the pouch 70' and there is also reduced pressure maintained beneath the pouch 70' through the bleed passage 76. The valve disc 108 is accordingly maintained on the seat flange 80 so that communication between the chamber above the pouch 70', the passage 82 and nipple 83, which is connected by the tube 84 with an exhaust line nipple 63, is closed off. Under these conditions the group of blocking valves forming the bank with which the on-off valve is connected, is maintained closed and accordingly no air impulse can be transmitted through any of the lines 34 connected with the nipples of the impulse plate 23 to the lines 65 or 66 connected respectively with the tubes 16, 18 of the robot machines.

The admission of atmospheric air into the passage 71 of an on-off valve effects the upward movement or flexing of the pouch leather 70' and the button 70*a*, secured upon the top of the pouch, strikes the lower end of the stem 109 and elevates the valve disc 108 from the seat flange 80 bringing the leather upon the top of the disc 108 to seat on flange 86*a* and into closing position over the opening 91 and flexing the diaphragm 93 upwardly into the pouch pocket 101. This upward movement is permitted by provision of the breather port 95 which allows the diaphragm pouch to move upwardly without reducing the pressure in the recess 90. The reduced pressure or vacuum will then be established through the chamber forming recess 78 and through the tube connected with the passage 82 to apply vacuum to all of the valves of the bank with which the nipple 83 is connected. With the blocking valves of the bank thus opened an air impulse can be transmitted through the tubes 34 to the nipples 61 and through the opened blocking valves to the vacuum tubes 16 or 18 of the selected robot machine.

The passages 71 and 102 are designated "on" and "off" respectively.

The control of the on-off valves by the operator of the manual typewriter is effected by means of an impulse valve which is generally designated 112. One of these impulse valves is provided for each on-off valve and where two banks of blocking valves are used the impulse valves are interconnected with the two on-off valves whereby when one bank of blocking valves is turned on the other bank will be turned off and vice versa. Since the impulse valves are of duplicate construction the description of one will suffice for the other.

Each impulse valve comprises a plate 113 through which are formed two ports or passages 114 and 115 which have connected therewith the nipples 114' and 115' respectively.

Disposed across the underside of the plate 113 is a flat valve blade 116 which is suitably secured to the plate 113 at one end and retained in position by a spring 117 whereby it may be sprung down away from the two ports 114 and 115 across which it extends. One end of this blade 116 projects beyond a side of the plate 113 and carries a suitable button 118 to facilitate the manual flexing of the blade to effect the simultaneous opening of the ports 114 and 115.

The valve blade 116 may be provided with suitable pads 119 for closing the ports. It will be seen that the impulse valves are of similar construction to the valves of the impulse plate 23 with the exception that the flat blade 116 of the impulse valve controls two ports both of which are opened when the blade is flexed downwardly and closed when the blade is allowed to return to its initial position.

When two impulse valves are used for the control of two on-off valves and two banks of blocking valves one nipple of each impulse valve is connected with an "off" port of an on-off valve and the other nipple of each impulse valve is connected with the "on" port of an on-off valve. Thus it will be seen upon reference to the diagrammatic view forming Fig. 4 that when the button 118 for the No. 1 impulse valve, for example, is depressed, atmospheric air will be admitted to each of the ports or openings 114 and 115 thereof and such air impulse will travel through the air tube 119 to the "off" port of the No. 2 on-off valve and air will also flow through the other port through the tube 120 to the "on" port of the No. 1 on-off valve.

In the light of the hereinbefore given description of the operation of the on-off valve it will be apparent that the air impulse passing through the tube 120 to the "on" port of the No. 1 on-off valve will cause the rising of the diaphragm pouch 70' to raise the valve element 107 and permit the vacuum to be drawn through the vacuum line 84 leading to the vacuum or exhaust line nipple 63. Thus all of the blocking valves of the No. 1 bank will be opened while those of the No. 2 bank will remain closed.

The system is now set or prepared for the manually operated typewriter control or operation of the No. 1 robot machine.

When the No. 1 robot machine is thus ready for operation and the paper has been placed therein preparatory to the automatic typing of material thereon under the control of the perforated paper tape passing over the apertured sensing bar 14, before starting the typing operation by the mechanically operated typewriter under control of the perforated tape, the operator at the manually operated typewriter 20 can effect the typing in of a date, name and address and salutation heading or other material on the letter and at the same time type on the manually operated typewriter, an envelope with name and address or other material to go with the material to be automatically typed by the No. 1 robot machine.

Upon the completion of the procedure above described the operator cuts out the manually operated typewriter from the No. 1 robot machine by depressing the button 118 of the No. 2 impulse valve thereby admitting an atmospheric air impulse to the "off" port of the No. 1 on-off valve and also admitting an atmospheric air impulse through the tube 120 to the "on" port of the No. 2 on-off valve. This accordingly prepares the system for operation of the robot No. 2 machine under the control of the manually operated typewriter. The robot No. 1 typewriter perforated control tape can then be started to effect the automatic typing operation under the control of the perforated tape passing over the sensing bar 14.

As has been hereinbefore stated the robot machines which are diagrammatically illustrated are of a standard or well known construction and since no changes are made in the same other than to provide for the connection of the air conducting tubes 65 and 66 with the known vacuum lines 16 and 18 of the two machines, it is not believed that any detailed illustration or description of the robot machines is required and none is given. It will be also understood that each of the robot machines is provided with a conventional means for turning on and off the automatic typing operation of the same is necessary in its use in the system of the present invention.

While the illustration and description have been directed to the use of two banks of blocking valves with two robot machines, two on-off valves and two impulse valves it is to be understood that a larger number of robot machines may be used and controlled by the manually operated typewriter by providing the necessary additional banks of blocking valves, on-off valves and impulse valves and also use may be made also of a single bank of blocking valves for the operation of a single robot or mechanically operated typewriter.

We claim:

1. A system of plural typewriter operation, comprising a mechanically operated pneumatic typewriter of the type in which there is a tracker bar having openings covered and uncovered in a predetermined order by a perforated tape moving thereover and evacuated tubes running from said openings to pneumatic actuators for the typewriter keys, a manually operated typewriter, a plurality of normally closed impulse valves each operatively connected with a key of the manually operated typewriter to be opened by the actuation of the manually operated typewriter keys, air conduits each connected at one end with one of said valves and connected at its other end with an evacuated tube, a blocking valve in each of said conduits, and means for selectively opening and closing all of the blocking valves in the conduits, said pneumatic typewriter having means for starting and stopping the movement of said tape while maintaining said tubes evacuated, and each of said normally closed impulse valves when opened while said blocking valves are open and said tape has been stopped, admitting an air impulse to a conduit and to the evacuated tube with which the conduit is connected.

2. The invention according to claim 1, wherein the means by which all of the blocking valves are opened is vacuum actuated.

3. A system of plural typewriter operation, comprising plural mechanically operated pneumatic typewriters each of the type in which there is a tracker bar having openings covered and uncovered in a predetermined order by apertures of a perforated tape passing thereover and evacuated tubes running from said openings to pneumatic actuators for the mechanically operated pneumatic typewriter keys, a single manually operated typewriter, a plurality of normally closed impulse valves, operative means between each of said valves and a key of the manually operated typewriter by which the valve is opened upon actuation of its respective key, air conduits each connected at one end with an impulse valve, a group of air conduits for each pneumatic typewriter and each conduit being connected at one end with an evacuated tube of its respective mechanically operated pneumatic typewriter, a bank of blocking valves for each group of air conduits, one blocking valve being connected with one air conduit of the group, common means connecting the banks of blocking valves with the first named conduits whereby when the blocking valves of one bank are opened the first air conduits will each by directly connected with one conduit connected with a blocking valve of the open bank, and means for selectively opening the blocking valves of one bank while the other blocking valves remain closed, said mechanically operated pneumatic typewriters having means for starting and stopping the movement of said tape while maintaining the tubes evacuated and each of said normally closed impulse valves when opened while the blocking valves of said one bank are open and the tape of the respective mechanically operated pneumatic typewriter has been stopped, admitting an air impulse through an open blocking valve to an evacuated tube.

4. The invention according to claim 3, wherein said means for selectively opening the blocking valves of one bank includes a vacuum actuated diaphragm.

5. The invention according to claim 3, wherein the said means for selectively opening the banks of blocking valves includes a movable diaphragm, means for applying pneumatic force to the diaphragm to move the same to valve open position, and means for selectively applying such pneumatic force whereby only the valves of one bank will be open at a time.

6. The combination of a mechanically operated pneumatic typewriter of the type embodying a key actuating selector mechanism, a manually operated typewriter, normally closed valve elements corresponding in number to the keys of the manually operated typewriter, an evacuated air conduit connected between each valve element and an element of the key actuating selector mechanism of the mechanically operated typewriter, a blocking valve in each air conduit, means for effecting the opening and closing of the blocking valves, and means operatively coupling each key of the manually operated typewriter with one of said normally closed valve elements for effecting opening of latter valve element upon actuation of the key coupled therewith to admit an air impulse through the associated evacuated air conduit to an element of the selector mechanism when the blocking valve in the conduit is open.

7. The invention according to claim 6, wherein the said blocking valves each embodies a diaphragm for closing off communication between two ports forming parts of the air conduit, and means for moving the diaphragm away from the ports to establish communication between the same.

8. The invention according to claim 7, wherein the means for moving said diaphragm to effect opening and closing the blocking valves embodies application of vacuum to the side of the diaphragm opposite the said two ports.

9. In combination, at least two mechanically operated pneumatic typewriters of the type having an apertured tracker bar, a perforated tape movable thereover to cover and uncover the apertures of the bar and pneumatic actuators for the typewriter keys, each actuator being connected by a normally evacuated air tube with a bar aperture, a manually operated typewriter, a plurality of coupling nipples each associated with a key of the manually operated typewriter, evacuated air conduit means connecting each of said nipples with an evacuated air tube of each of the mechanically operated typewriters, means for selectively effecting the opening and closing of the conduit means to either of the mechanically operated typewriters, said last means being effective to maintain the conduit means connected with one of the mechanically operated typewriters closed while maintaining the conduit means to the other mechanically operated typewriter open, and means actuated by and upon operation of each key of the manually operated typewriter for admitting an air impulse to the associated nipple for transmittal to and through the respective evacuated tube of said other mechanically operated typewriter through the open conduit means connected to said associated nipple.

10. The invention according to claim 9, wherein the said means for selectively effecting the opening and closing of the conduit means connected with each of the mechanically operated typewriters comprises a vacuum actuated blocking valve in each conduit means, and manually operated means for switching the vacuum action from the blocking valves as a group in the conduit means leading to one mechanically operated typewriter to the blocking valves as a group in the conduit means leading to the other mechanically operated typewriter whereby one group of blocking valves is maintained open while the other group is maintained closed.

11. A system of plural typewriter operation comprising a mechanically operated pneumatic typewriter of the type embodying a key actuating selector mechanism including evacuated tubes connected to pneumatic actuators for the typewriter keys, a manually operated typewriter, impulse valve means connected with the keys of the manually operated typewriter and controlled by actuation of the manually operated typewriter keys, air conduits connected between said impulse valve means and said evacuated tubes, blocking valve means for controlling the flow of air through said air conduits, and means for selectively operating said blocking valve means, said impulse valve means, air conduits and blocking valve means cooperating upon actuation of keys of the manually operated typewriter to admit air impulses to said evacuated tubes.

12. Apparatus as defined in claim 11, wherein said key actuating selector mechanism includes a tracker bar having openings covered and uncovered in a predetermined order by a perforated tape moving thereover, said evacuated tubes running from said openings to said pneumatic actuators, and means for starting and stopping the movement of said tape while maintaining said tubes evacuated.

13. Apparatus as defined in claim 11, wherein said means for selectively operating said blocking valve means is vacuum actuated.

References Cited in the file of this patent

UNITED STATES PATENTS

| | | |
|---|---|---|
| 726,560 | Neahr | Apr. 28, 1903 |
| 1,121,730 | Keely | Dec. 22, 1914 |
| 1,998,830 | Beebe | Apr. 23, 1935 |
| 2,297,793 | Nichols et al. | Oct. 26, 1942 |